United States Patent
Yu et al.

(10) Patent No.: US 11,037,339 B2
(45) Date of Patent: Jun. 15, 2021

(54) SYSTEMS AND METHODS FOR IMAGE RECONSTRUCTION

(71) Applicant: UIH AMERICA, INC., Houston, TX (US)

(72) Inventors: Zhicong Yu, Houston, TX (US); Stanislav Zabic, Houston, TX (US)

(73) Assignee: UIH AMERICA, INC., Houston, TX (US)

( * ) Notice: Subject to any disclaimer, the term of this patent is extended or adjusted under 35 U.S.C. 154(b) by 121 days.

(21) Appl. No.: 16/387,428

(22) Filed: Apr. 17, 2019

(65) Prior Publication Data

US 2020/0334869 A1    Oct. 22, 2020

(51) Int. Cl.
*G06T 11/00* (2006.01)
*G06T 7/00* (2017.01)

(52) U.S. Cl.
CPC .......... *G06T 11/006* (2013.01); *G06T 7/0012* (2013.01); *G06T 2207/10104* (2013.01); *G06T 2211/421* (2013.01); *G06T 2211/424* (2013.01)

(58) Field of Classification Search
CPC . G06T 11/003; G06T 15/04; G06T 2211/421; G06F 17/15
See application file for complete search history.

(56) References Cited

U.S. PATENT DOCUMENTS

| | | | | |
|---|---|---|---|---|
| 5,978,505 | A * | 11/1999 | Sutton | G06T 5/20 382/156 |
| 2007/0083114 | A1 * | 4/2007 | Yang | G06T 5/50 600/437 |
| 2017/0294034 | A1 * | 10/2017 | Zhou | G06T 11/008 |

OTHER PUBLICATIONS

M Persson et al., Total Variation Norm for Three-Dimensional Iterative Reconstruction in Limited View Angle Tomography. Physics in Medicine and Biology, 46(3): 853-865, 2001.

Jeffrey A. Fessler, Penalized Weighted Least-Squares Image Reconstruction for Positron Emission Tomography, IEEE Transactions on Medical Imaging, 13(2): 290-300, 1994.

Daniel F. Yu et al., Edge-Preserving Tomographic Reconstruction with Nonlocal Regularization, IEEE Transactions on Medical Imaging, 21(2): 159-173, 2002.

Oleksandr Zadorozhnyi et al., Huber-Norm Regularization for Linear Prediction Models, Machine Learning and Knowledge Discovery in Databases: European Conference, 2016.

* cited by examiner

*Primary Examiner* — Joshua L Schwartz
(74) *Attorney, Agent, or Firm* — Metis IP LLC

(57) ABSTRACT

The present disclosure relates to systems and methods for reconstructing an image in an imaging system. The methods may include obtaining scan data representing an intensity distribution of energy detected at a plurality of detector elements and determining an image estimate. The methods may further include determining an objective function based on the scan data and the image estimate. The objective function may include a regularization parameter. The methods may further include iteratively updating the image estimate until the objective function satisfies a termination criterion, and for each update, updating the regularization parameter based on a gradient of an updated image estimate. The methods may further include outputting a final image based on the updated image estimate when the objective function satisfies the termination criterion.

20 Claims, 11 Drawing Sheets

SYSTEMS AND METHODS FOR IMAGE RECONSTRUCTION

TECHNICAL FIELD

The present disclosure generally relates to imaging technologies, and more particularly, relates to systems and methods for image reconstruction.

BACKGROUND

Imaging technologies have been widely used for clinical examination and medical diagnosis. After an imaging device acquires scan data of a subject, an image may be reconstructed based on the scan data. In an iterative image reconstruction process, an objective function is often adopted to determine an optimal image through a number of iterations. The objective function may include a regularization term configured to stabilize the reconstruction process and decrease noise in a reconstructed image. The regularization term may be multiplied by a regularization parameter configured to define a regularization strength of the regularization term. Regularization term models a-priori known structural characteristics of the scanned object and one popular choice is the Huber regularization term with a parameter which controls switching from quadratic to linear regularization. Because Huber switches from linear to quadratic regularization, it is desirable to allow the regularization strength to change based on the encountered gradients in the evolving image.

SUMMARY

According to an aspect of the present disclosure, a system configured to reconstruct an image in an imaging system is provided. The system may include at least one non-transitory storage medium including a set of instructions and at least one processor in communication with the at least one non-transitory storage medium. When executing the set of instructions, the at least one processor may be configured to cause the system to obtain scan data representing an intensity distribution of energy detected at a plurality of detector elements and determine an image estimate. The at least one processor may be further configured to cause the system to determine an objective function based on the scan data and the image estimate. The objective function may include a regularization parameter. The at least one processor may be further configured to cause the system to iteratively update the image estimate until the objective function satisfies a termination criterion. The at least one processor may be further configured to cause the system to, for each update, update the regularization parameter based on a gradient of an updated image estimate. The at least one processor may be further configured to cause the system to output a final image based on the updated image estimate when the objective function satisfies the termination criterion.

In some embodiments, the imaging system may be one of a medical imaging system or a non-invasive industrial imaging system.

In some embodiments, the medical imaging system may be at least one of a computed tomography system, a positron emission tomography system, or a single photon emission computed tomography system.

In some embodiments, to determine the objective function, the at least one processor may be further configured to cause the system to determine an estimated measurement based on the image estimate or the updated image estimate. The at least one processor may be further configured to cause the system to determine an actual measurement based on the scan data and determine the objective function based at least in part on a difference between the estimated measurement and the actual measurement.

In some embodiments, the objective function may further include a regularization term, and the at least one processor may be further configured to cause the system to multiply the regularization term by the regularization parameter.

In some embodiments, the regularization term may relate to a Huber type transition between linear regularization and quadratic regularization.

In some embodiments, the at least one processor may be further configured to cause the system to determine a first parameter based on the linear regularization and determine a second parameter based on the quadratic regularization. The regularization parameter may transition between the first parameter and the second parameter.

In some embodiments, the regularization term may be a Huber regularization term.

In some embodiments, to update the regularization parameter, the at least one processor may be further configured to cause the system to determine and update the regularization strength based on a scalar.

In some embodiments, to update the regularization parameter, the at least one process may be further configured to cause the system to update the regularization parameter based on an exponential function related to the first parameter, the second parameter, the scalar parameter, and the gradient of the image estimate.

According to another aspect of the present disclosure, a method for reconstructing an image in an imaging system is provided. The method may be implemented on a machine having at least one processor and a storage device. The method may include obtaining scan data representing an intensity distribution of energy detected at a plurality of detector elements and determining an image estimate. The method may further include determining an objective function based on the scan data and the image estimate. The objective function may include a regularization parameter. The method may further include iteratively updating the image estimate until the objective function satisfies a termination criterion, and for each update, updating the regularization parameter based on a gradient of an updated image estimate. The method may further include outputting a final image based on the updated image estimate when the objective function satisfies the termination criterion.

According to yet another aspect of the present disclosure, a system configured to reconstruct an image in an imaging system is provided. The system may include an acquisition module, configured to obtain scan data representing an intensity distribution of energy detected at a plurality of detector elements. The system may further include an image reconstruction module. The image reconstruction module may be configured to determine an image estimate and determine an objective function based on the scan data and the image estimate. The objective function may include a regularization parameter. The image reconstruction module may be further configured to iteratively update the image estimate until the objective function satisfies a termination criterion, and for each update, update the regularization parameter based on a gradient of an updated image estimate. The image reconstruction module may be further configured to output a final image based on the updated image estimate when the objective function satisfies the termination criterion.

According to still another aspect of the present disclosure, a non-transitory computer readable medium is provided. The non-transitory computer readable medium may include at least one set of instructions. When executed by at least one processor of a computer device, the at least one set of instructions may direct the at least one processor to obtain scan data representing an intensity distribution of energy detected at a plurality of detector elements and determine an image estimate. The at least one set of instructions may further direct the at least one processor to determine an objective function based on the scan data and the image estimate. The objective function may include a regularization parameter. The at least one set of instructions may further direct the at least one processor to iteratively update the image estimate until the objective function satisfies a termination criterion, and for each update, update the regularization parameter based on a gradient of an updated image estimate. The at least one set of instructions may further direct the at least one processor to output a final image based on the updated image estimate when the objective function satisfies the termination criterion.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
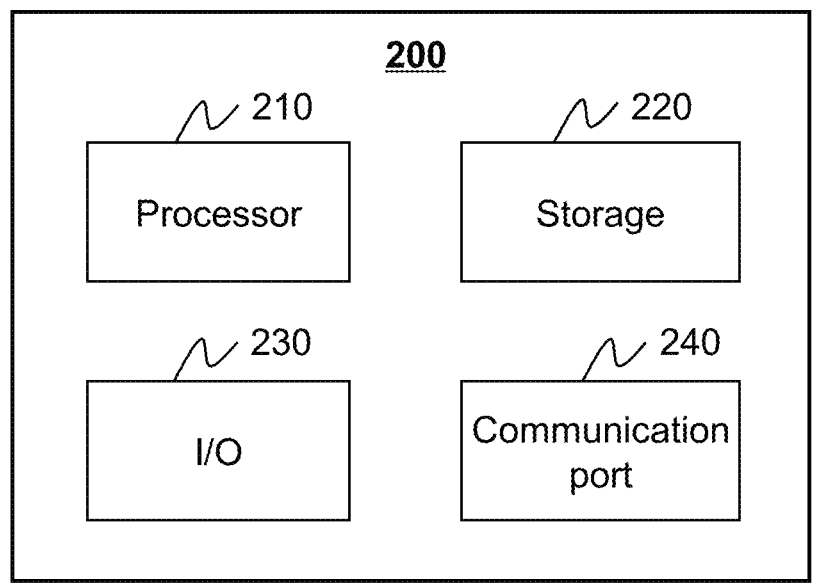
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for an imaging system. In some embodiments, the imaging system may include a single modality imaging system and/or a multi-modality imaging system. The single modality imaging system may include, for example, an X-ray imaging system, an computed tomography (CT) system, a magnetic resonance imaging (MRI) system, an ultrasonography system, a positron emission tomography (PET) system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The present disclosure provides mechanisms (which can include methods, systems, computer-readable medium, etc.) for reconstructing an image. For instance, scan data related to a subject may be obtained by an imaging device (e.g., a CT scanner). The scan data may represent an intensity distribution of energy detected at one or more detector elements. An image estimate may be determined. In some embodiments, an objective function may be used to iteratively update the image estimate until the objective function satisfies a termination criterion and obtains a final image as the reconstructed image. For example, the objective function may be determined based on a difference between the estimated measure and an actual measurement, a regularization term, and a regularization parameter. The estimated measurement may be obtained by a forward projection on the image estimate or updated image estimate. The actual measurement may be obtained based on the intensity distribution of energy emitted from an imaging device and/or the intensity distribution of energy detected at one or more detector elements. In some embodiments, the regularization parameter may be determined based on a first parameter (e.g., a total variation regularization parameter), a second parameter (e.g., a quadratic regularization parameter), and a gradient of the image estimate or updated image estimate. In some embodiments, for each iteration of updating the image estimate, the regularization parameter may be updated based on the gradient of the updated image estimate in the current iteration.

Figure 1:
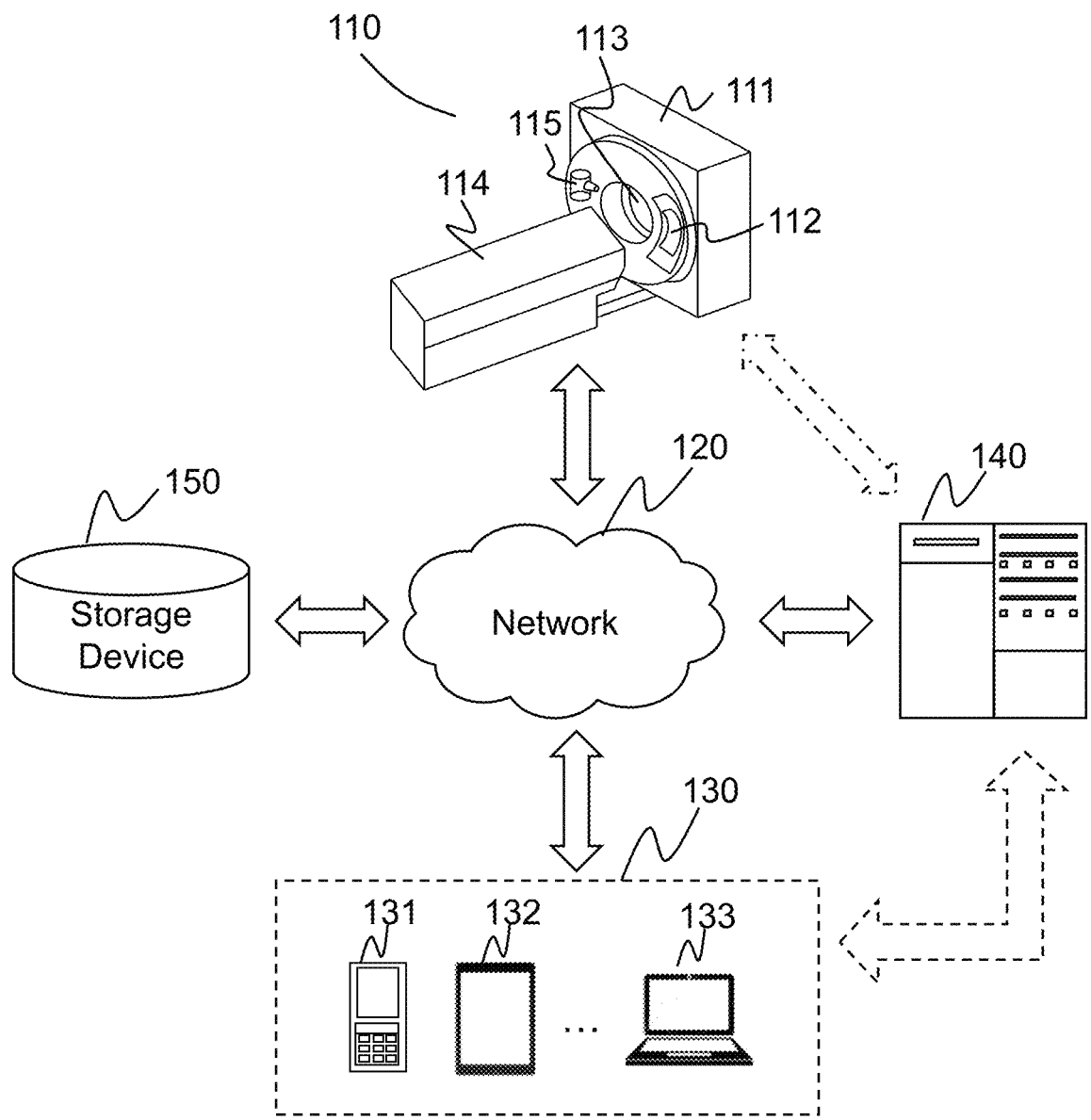
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. In some embodiments, the imaging system may be a medical imaging system or an industrial imaging system, such as a CT system, a PET system, a SPECT system, an x-ray tomosynthesis system, an MRI system, or the like, or any combination thereof. In some embodiments, the medical imaging system may be configured to obtain an anatomical structure of a subject or information related to biological processes in the body of the subject, so as to perform a medical examination, a diagnosis, a surgery, etc. In some embodiments, the industrial imaging system may be configured to obtain an inner structure and/or outer dimensions of a subject in a non-invasive way. For instance, the industrial imaging system may determine a three-dimensional model based on obtained scan data. The model may be used to produce a product, for example, by three-dimensional printing. As shown, the imaging system 100 may include an imaging device 110, a network 120, one or more terminals 130, a processing engine 140, and a storage device 150. In some embodiments, the imaging device 110, the terminal(s) 130, the processing engine 140, and/or the storage device 150 may be connected to and/or communicate with each other via a wireless connection (e.g., the network 120), a wired connection, or a combination thereof. The connection between the components of the imaging system 100 may be variable. Merely by way of example, the imaging device 110 may be connected to the processing engine 140 through the network 120, as illustrated in FIG. 1. As another example, the imaging device 110 may be connected to the processing engine 140 directly. As a further example, the storage device 150 may be connected to the processing engine 140 through the network 120, as illustrated in FIG. 1, or connected to the processing engine 140 directly. As still a further example, a terminal 130 may be connected to the processing engine 140 through the network 120, as illustrated in FIG. 1, or connected to the processing engine 140 directly.

The imaging device 110 may generate or provide image data via scanning a subject (e.g., a patient) disposed on a scanning table of the imaging device 110. In some embodiments, the imaging device 110 may include a single-modality scanner and/or multi-modality scanner. The single-modality scanner may include, for example, a CT scanner, a PET scanner, an MRI scanner, a SPECT scanner, or the like. The multi-modality scanner may include a single photon emission computed tomography-computed tomography (SPECT-CT) scanner, a positron emission tomography-computed tomography (PET-CT) scanner, a computed tomography-ultra-sonic (CT-US) scanner, a digital subtraction angiography-computed tomography (DSA-CT) scanner, or the like, or a combination thereof. In some embodiments, the image data may include projection data, images relating to the subject, etc. The projection data may be raw data generated by the imaging device 110 by scanning the subject, or data generated by a forward projection on an image relating to the subject. In some embodiments, the subject may include a body, a substance, an object, or the like, or a combination thereof. In some embodiments, the subject may include a specific portion of a body, such as a head, a thorax, an abdomen, or the like, or a combination thereof. In some embodiments, the subject may include a specific organ or region of interest, such as an esophagus, a trachea, a bronchus, a stomach, a gallbladder, a small intestine, a colon, a bladder, a ureter, a uterus, a fallopian tube, etc.

In some embodiments, the imaging device 110 may include a gantry 111, a detector 112, a detecting region 113, a scanning table 114, and a radioactive scanning source 115. The gantry 111 may support the detector 112 and the radioactive scanning source 115. A subject may be placed on the scanning table 114 to be scanned. The radioactive scanning source 115 may emit radioactive rays to the subject. The radiation may include a particle ray, a photon ray, or the like, or a combination thereof. In some embodiments, the radiation may include a plurality of radiation particles (e.g., neutrons, protons, electron, p-mesons, heavy ions), a plurality of radiation photons (e.g., X-ray, a y-ray, ultraviolet, laser), or the like, or a combination thereof. The detector 112 may detect radiations and/or radiation events (e.g., gamma photons) emitted from the detecting region 113. In some embodiments, the detector 112 may include a plurality of detector elements. The detector elements may include a scintillation detector (e.g., a cesium iodide detector), a gas detector, etc. The detector element may be a single-row detector or a multi-rows detector.

In some embodiments, the imaging device 110 may be integrated with one or more other devices that may facilitate the scanning of the subject, such as, an image-recording device. The image-recording device may be configured to take various types of images related to the subject. For example, the image-recording device may be a two-dimensional (2D) camera that takes pictures of the exterior or outline of the subject. As another example, the image-recording device may be a 3D scanner (e.g., a laser scanner, an infrared scanner, a 3D CMOS sensor) that records the spatial representation of the subject.

The network 120 may include any suitable network that can facilitate exchange of information and/or data for the imaging system 100. In some embodiments, one or more components of the imaging system 100 (e.g., the imaging device 110, the processing engine 140, the storage device 150, the terminal(s) 130) may communicate information and/or data with one or more other components of the imaging system 100 via the network 120. For example, the processing engine 140 may obtain image data from the imaging device 110 via the network 120. As another example, the processing engine 140 may obtain user instruction(s) from the terminal(s) 130 via the network 120. The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may be connected to and/or communicate with the imaging device 110, the processing engine 140, and/or the storage device 150. For example, the terminal(s) 130 may obtain a processed image (e.g., a reconstructed image) from the processing engine 140. As another example, the terminal(s) 130 may obtain image data acquired via the imaging device 110 and transmit the image data to the processing engine 140 to be processed. In some embodiments, the terminal(s) 130 may include a mobile device 131, a tablet computer 132, a laptop computer 133, or the like, or any combination thereof. For example, the mobile device 131 may include a mobile phone, a personal digital assistance (PDA), a gaming device, a navigation device, a point of sale (POS) device, a laptop, a tablet computer, a desktop, or the like, or any combination thereof. In some embodiments, the terminal(s) 130 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 140 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 130 may be part of the processing engine 140.

The processing engine 140 may process data and/or information obtained from the imaging device 110, the storage device 150, the terminal(s) 130, or other components of the imaging system 100. For example, the processing engine 140 may determine an image estimate and iteratively update the image estimate to obtain a final image based on scan data generated by the imaging device 110. In some embodiments, the processing engine 140 may be a single server or a server group. The server group may be centralized or distributed. In some embodiments, the processing engine 140 may be local to or remote from the imaging system 100. For example, the processing engine 140 may access information and/or data from the imaging device 110, the storage device 150, and/or the terminal(s) 130 via the network 120. As another example, the processing engine 140 may be directly connected to the imaging device 110, the terminal(s) 130, and/or the storage device 150 to access information and/or data. In some embodiments, the processing engine 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing engine 140 may be implemented by a computing device 200 having one or more components as described in connection with FIG. 2.

The storage device 150 may store data, instructions, and/or any other information. In some embodiments, the storage device 150 may store data obtained from the processing engine 140, the terminal(s) 130, and/or the interaction device 150. In some embodiments, the storage device 150 may store data and/or instructions that the processing engine 140 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing engine 140, the terminal(s) 130). One or more components of the imaging system 100 may access the data or instructions stored in the storage device 150 via the network 120. In some embodiments, the storage device 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process image data obtained from the imaging device 110, the terminals 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operation s A and B).

The storage 220 may store data/information obtained from the imaging device 110, the terminals 130, the storage device 150, and/or any other component of the imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for determining the position of a target region of a subject (e.g., a target portion of a patient).

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 140 and the imaging device 110, the terminals 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
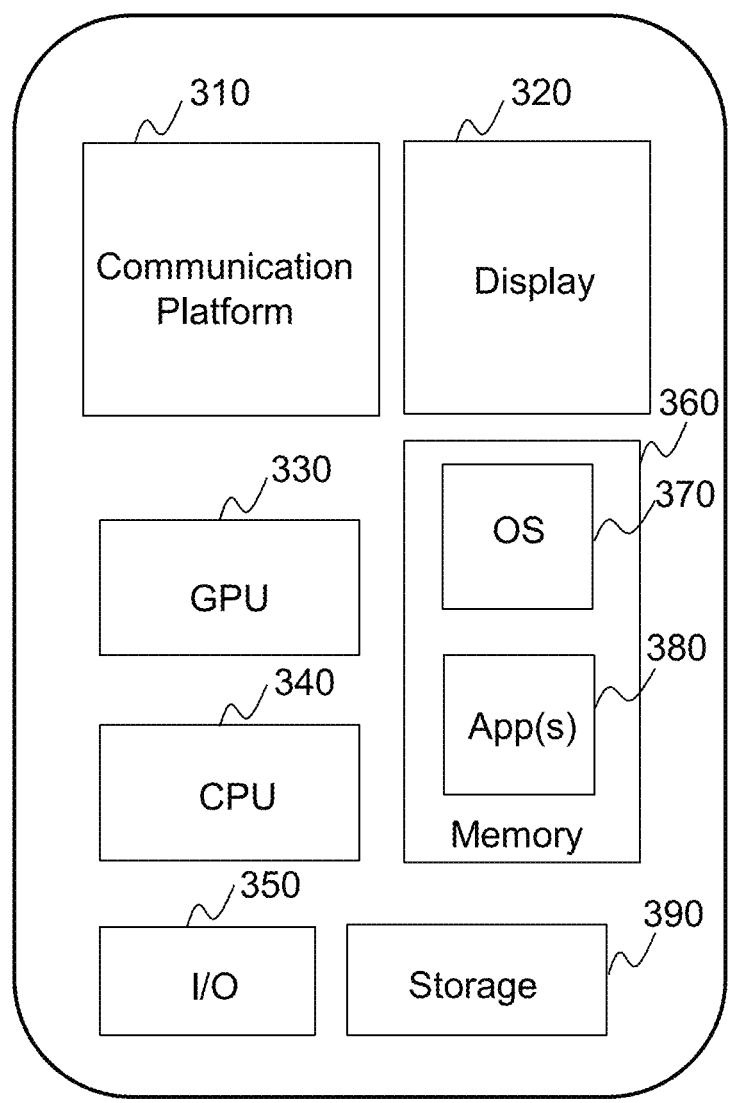
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminals 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, an operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
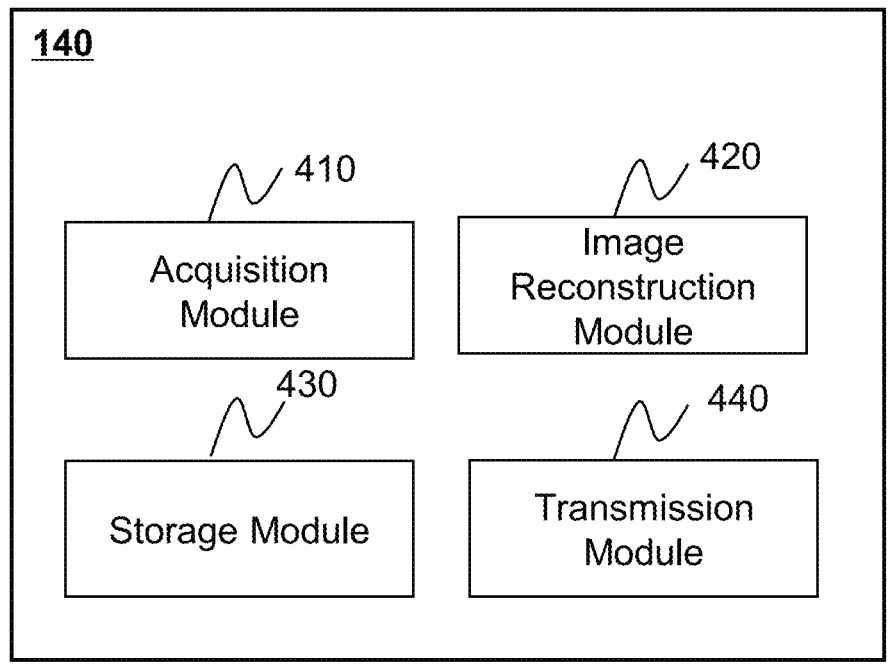
FIG. 4 is a block diagram illustrating an exemplary processing engine according to some embodiments of the present disclosure.

FIG. 4 is a block diagram illustrating an exemplary processing engine 140 according to some embodiments of the present disclosure. As illustrated in FIG. 4, the processing engine 140 may include an acquisition module 410, an image reconstruction module 420, a storage module 430, and a transmission module 440. The modules may be hardware circuits of all or part of the processing engine 140. The modules may also be implemented as an application or set of instructions read and executed by the processing engine 140. Further, the modules may be any combination of the hardware circuits and the application/instructions. For example, the modules may be the part of the processing engine 140 when the processing engine 140 is executing the application/set of instructions.

The acquisition module 410 may acquire data related to the imaging system 100. In some embodiments, the acquisition module 410 may acquire data from one or more components of the imaging system 100. For example, the acquisition module 410 may obtain scan data representing an intensity distribution of energy from a plurality of detector elements in the imaging device 110. For instance, the scan data may be related to a CT scan, or the like. As another example, the acquisition module 410 may obtain the scan data from the storage device 150. In some embodiments, the acquisition module 410 may obtain a type of objective function (interchangeably referred to as "target function") and/or an image estimate from the storage device 150 or the terminal(s) 130. The objective function may be related to, for example, a difference between the estimated measurement (e.g., estimated projection data) and the actual measurement (e.g., actual projection data, a regularization term, and a regularization parameter related to the regularization term. In some embodiments, the regularization term may include a Huber regularization term, and the regularization parameter related to the regularization term may be determined to switch between the linear and quadratic regularization based on the image gradients.

The image reconstruction module 420 may reconstruct an image based on information acquired from the acquisition module 410. In some embodiments, the image reconstruction module 420 may determine the image estimate according to an image reconstruction algorithm. The image reconstruction algorithm may include but is not limited to a Fourier slice theorem algorithm, a filtered back projection (FBP) algorithm, a fan-beam reconstruction algorithm, an analytical reconstruction algorithm, or the like, or any combination thereof. In some embodiments, the image reconstruction module 420 may iteratively update the image estimate until the objective function satisfies a termination criterion. For instance, the image reconstruction model 420 may determine (or update) a regularization parameter and a regularization term based on a gradient of the image estimate (or the updated image estimate). The image reconstruction model 420 may determine an output value of the objective function based on the image estimate or the updated image estimate and further determine whether the output value of the objective function satisfies the termination criterion. In response to a determination that the output value of the objective function does not satisfy the termination criterion, the image reconstruction model 420 may continue to perform an iteration. In response to a determination that the output value of the objective function satisfies the termination criterion, the processing engine 140 may end the iterations and designate the corresponding updated image estimate as the final image. Merely by way of example, the termination criterion may include that the output value of the objective function is minimal or smaller than a preset value, the change(s) of the output value of the objective function in two or more consecutive iterations is equal to or smaller than a threshold, the difference between the output value of the objective function and the preset value is equal to or smaller than a threshold, or the like, or any combination thereof.

The storage module 430 may store information related to the imaging system 100. In some embodiments, the storage module 430 may store the objective function and preset values related to one or more parameters of the objective function. The one or more parameters of the objective function may include a threshold σ for the gradient of the image estimate or updated image estimate, a scalar parameter σ defining a transition slope from linear to quadratic, or the like, or any combination thereof. In some embodiments, the storage module 430 may store the intermediate data generated during image reconstruction. For example, the storage module 40 may store one or more updated image estimates generated from one or more iterations and one or more output values of the objective function based on the one or more updated image estimates.

The transmission module 440 may send information and/or an instruction to one or more components of the imaging system. In some embodiments, the transmission module 440 may send the final image to the terminal(s) 130 for displaying. In some embodiments, the transmission module 440 may send the final image to other modules/devices for further processing on the final image. For example, one or more final images may be used to reconstruct a 3D image based on a 3D reconstruction method. The 3D reconstruction method may include a multi-planar reconstruction (MPR) algorithm, a curved planar reconstruction (CPR) algorithm, a maximum intensity projection (MIP) algorithm, a volume rendering technique (VRT), or the like, or any combination thereof. In some embodiments, the transmission module 440 may send the final image to the storage module 430 and/or the storage device 150 for storage.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, any module mentioned above may be divided into two or more units. For example, the image reconstruction module 420 may be divided into two units, one of which may be configured to determine an image estimate, and the other one may be configured to update the image estimate based on an objective function to obtain the final image. In some embodiments, the processing engine 140 may include one or more additional modules. For example, the processing engine 140 may further include a control module configured to generate control signals for one or more components in the imaging system 100. In some embodiments, one or more modules of the processing engine 140 described above may be omitted. For example, the storage module 430 may be omitted.

Figure 5:
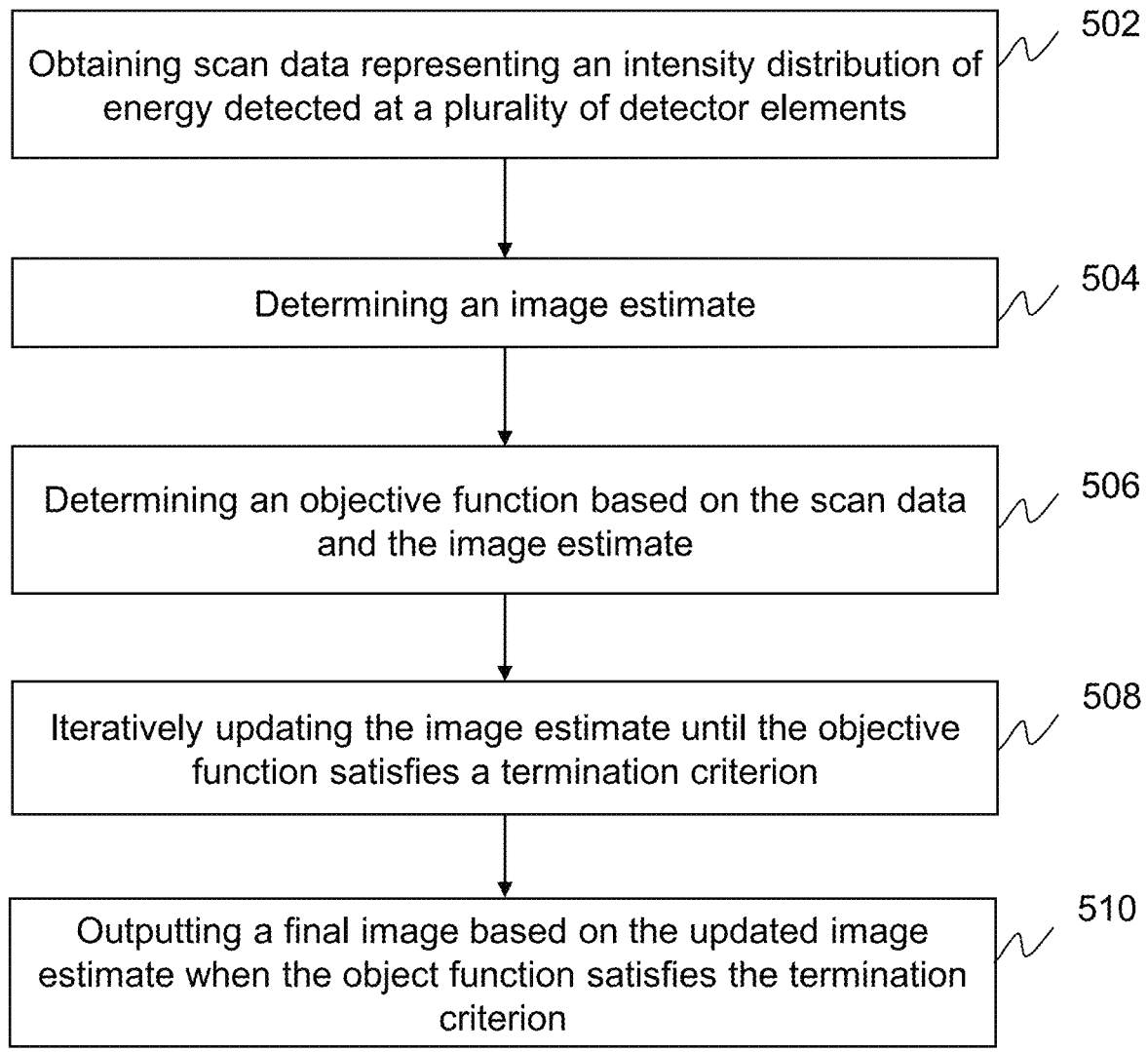
FIG. 5 is a flowchart illustrating an exemplary process for reconstructing an image according to some embodiments of the present disclosure.

FIG. 5 is a flowchart illustrating an exemplary process for reconstructing an image according to some embodiments of the present disclosure. At least a portion of process 500 may be implemented on the computing device 200 as illustrated in FIG. 2 or the mobile device 300 as illustrated in FIG. 3. In some embodiments, one or more operations of the process 500 may be implemented in the imaging system 100 as illustrated in FIG. 1. In some embodiments, one or more operations in the process 500 may be stored in the storage device 160 and/or the storage (e.g., the ROM 230, the RAM 240, etc.) as a form of instructions, and invoked and/or executed by the processing engine 140, or the processor 220 of the processing engine 140. In some embodiments, the instructions may be transmitted in a form of electronic current or electrical signals. In the following description, for illustration purposes, the image to be reconstructed is a CT image and is not intended to limit the scope of the present disclosure.

In 502, the processing engine 140 (e.g., the acquisition module 410) may obtain scan data representing an intensity distribution of energy detected at a plurality of detector elements. In some embodiments, the imaging device 110 of the imaging system 100 may perform a scan on a subject. In some embodiments, the subject may include a body, a substance, an object, or the like, or a part thereof, or a combination thereof. For example, the subject may include a specific portion of a body, such as a head, a thorax, an abdomen, or the like, or a combination thereof. As another example, the subject may include a specific organ, such as an esophagus, a trachea, a bronchus, a stomach, a gallbladder, a small intestine, a colon, a bladder, a ureter, a uterus, a fallopian tube, etc. In some embodiments, the plurality of detector elements of the imaging device 110 may detect the scan data related to the subject. In some embodiments, the scan data may represent an intensity distribution of energy associated with radiation beams that pass through the subject (e.g., X-rays). In some embodiments, the scan data may be generated based on multiple projections at different angles around the subject using the radiation beams. The processing engine 140 may obtain the scan data from the imaging device 110, the storage 150, the terminal(s) 130, or an external data source, etc.

In 504, the processing engine 140 (e.g., the image reconstruction module 420) may determine an image estimate. The image estimate may include a plurality of pixels or voxels. In some embodiments, the processing engine 140 may determine the image estimate based on default settings of the imaging system 100 or an instruction from a user. For instance, the gray values of the pixels or voxels in the image estimate may be set as the same, such as 0, 10, 50, etc. In some embodiments, the acquisition module 410 may acquire the image estimate from the storage device 150. In some embodiments, the processing engine 140 may determine the image estimate according to an image reconstruction algorithm. The image reconstruction algorithm may include but is not limited to a Fourier slice theorem algorithm, a filtered back projection (FBP) algorithm, a fan-beam reconstruction algorithm, an analytical reconstruction algorithm, or the like, or any combination thereof.

In 506, the processing engine 140 (e.g., the image reconstruction module 420) may determine an objective function based on the scan data and the image estimate. As used herein, determining an objective function may refer to determining an output value of the objective function. In some embodiments, the processing engine 140 may determine a final image through a plurality of iterations for minimizing the output value of the objective function. In some embodiments, the type of the objective function may be determined according to default settings of the imaging system 100 or an instruction from a user. For example, the type of the objective function may include a least square function, a least norm function, a quadratic optimization function, a Bayes estimation function, a maximum likelihood estimation (MLE) function, a maximum a posterior (MAP) function, a minimum variance function, a maximum entropy function, or the like, or a combination thereof.

In some embodiments, to determine the objective function, the processing engine 140 may determine an estimated measurement based on the image estimate or updated image estimate and determine an actual measurement based on the scan data. In some embodiments, the estimated measurement may include estimated projection data. For instance, the estimated measurement may be determined by performing a forward projection on the image estimate or the updated image estimate. In some embodiments, the actual measurement may include actual projection data. For example, the actual measurement may be determined based on the intensity distribution of the energy of the radiation beams emitted from the imaging device 110 and the intensity distribution of the energy of the radiation beams detected by the plurality of detector elements (e.g., the scan data). In some embodiments, the processing engine 140 may determine the objective function based at least in part on a difference between the estimated measurement and the actual measurement.

In some embodiments, the objective function may further include a regularization term and a regularization parameter. The regularization term may be configured to stabilize the reconstruction process and decrease the noise in the image estimate or in the updated image. The regularization parameter may be configured to control the strength of the regularization term. In some embodiments, the processing engine 140 may multiply the regularization term by the regularization parameter to determine the objective function. Merely by way of example, the objective function may be represented by the following equation (1):

$$L=\|FP(I)-P\|_w^2+\beta R(I), \quad (1)$$

where I denotes the image estimate or the updated image estimate, FP(I) denotes the estimated measurement (e.g., the estimated projection data), P denotes the actual measurement (e.g., the actual projection data), R(I) denotes the regularization term, and β denotes the regularization parameter which balances between the data likelihood and regularization.

In some embodiments, the regularization term may include a regularization term associated with a gradient of the image estimate or the updated image estimate. As used herein, the term "gradient of the image estimate or the updated image estimate" may refer to a change in the characteristics (e.g., an intensity) of the image estimate or the updated image estimate at a pixel or a voxel. The regularization term may have various embodiments. For instance, the regularization term may be a total variation regularization term, or it could be a quadratic regularization term, or it could be a Huber regularization term which transitions from quadratic to linear regularization based on the gradients in the updated image.

In some embodiments, the result of the objective function in equation (1) may be tuned, for example, by varying the regularization parameter β using the linear regularization term, and/or by varying the same regularization parameter β using the quadratic regularization term. Specifically, a first parameter (denoted as $\beta_1$) may be determined based on the linear regularization. A second parameter (denoted as $\beta_2$) may be determined based on the quadratic regularization. The regularization parameter β may transition between the first parameter $\beta_1$ and the second parameter $\beta_2$. In some embodiments, the first parameter $\beta_1$ and/or the second parameter $\beta_2$ may be determined according to an L-curve method, a quasi-optimal rule, a minimal-error rule, or the like, or any combination thereof. In some embodiments, the processing engine 140 may determine a scalar parameter based on the first parameter and the second parameter. In some embodiments, the scalar parameter may define a transition slope from $\beta_1$ to $\beta_2$. For instance, the scalar parameter may be 0.3, 0.35, 0.4, or the like. The result of two parameter tuning strategies can be unified by defining the regularization parameter β from the objective function in equation (1) as a function of parameters and gradients associated with the image using the following equation (2)

$$\beta_{AH}=\beta(\beta_1,\beta_2,\sigma,G(\underline{x})), \quad (2)$$

where $G(\underline{x})$ denotes the absolute value of the gradient in the function and σ is a threshold parameter value in Hounsfield units. In some embodiments, the transition function $\beta(\beta_1, \beta_2, \sigma, G(\underline{x}))$ may at least include an exponential function related to the first parameter, the second parameter, the scalar parameter, the gradient of the image estimate, and the threshold for the gradient of the image estimate or updated image estimate. Merely by way of example, the regularization parameter may be represented by the following equation (3):

$$\beta_{AH}=\beta_1\cdot\sigma+(\beta_1-\beta_2\cdot\sigma)\cdot\exp(-\alpha\cdot\sigma/(\underline{x})+\epsilon)), \quad (3)$$

where α denotes the transition parameter, and ϵ is a predetermined value to avoid division of zero.

In 508, the processing engine 140 (e.g., the image reconstruction module 420) may iteratively update the image estimate until the objective function satisfies a termination criterion. In some embodiments, the processing engine 140 may perform one or more iterations to update the image estimate. In some embodiments, the processing engine 140 may determine or update the regularization parameter and the regularization term based on a gradient of the image estimate or the updated image estimate. The processing engine 140 may further determine the output value of the objective function based on the regularization parameter and the regularization term, and determine whether the output value of the objective function satisfy the termination criterion. In response to a determination that the output value of the objective function does not satisfy the termination criterion, the processing engine 140 may continue to perform an iteration. In response to a determination that the output value of the objective function satisfies the termination criterion, the processing engine 140 may end the one or more iterations and designate the corresponding updated image estimate as the final image. Details regarding the iterations may also be found elsewhere in the present disclosure, for example, in FIG. 6 and the descriptions thereof.

In some embodiments, the termination criterion may be obtained from the storage device 150. In some embodiments, the termination criterion may be related to an output value of the objective function. For instance, the termination criterion may include that the output value of the objective function is minimal or smaller than a preset value, the change(s) of the output value of the objective function in two or more consecutive iterations is equal to or smaller than a threshold, the difference between the output value of the objective function and the preset value is equal to or smaller than a threshold, or the like, or any combination thereof. In some embodiments, the termination criterion may be associated with the updated image estimate generated in an iteration. For example, the termination criterion may include that a sum of the changes of the gray values of the pixels or voxels in the updated image estimates generated in two or more consecutive iterations is equal to or smaller than a predetermined threshold, such as 0.

In 510, the processing engine 140 (e.g., the image reconstruction module 420) may output a final image based on the updated image estimate when the objective function satisfies the termination criterion. In some embodiments, one or more additional operations may be performed on the final image. For example, the one or more additional operations may be configured to reconstruct a 3D image based on one or more final images. In some embodiments, the one or more operations may include multi-planar reconstruction (MPR), curved planar reconstruction (CPR), maximum intensity projection (MIP), a volume rendering technique (VRT), or the like, or any combination thereof. In some embodiments, the processing engine 140 (e.g., the transmission module 440) may transmit the final image to the terminal(s) 130 for display. In some embodiments, the processing engine 140 may transmit the final image to the storage device 150 to store the final image (e.g., in a database). In some embodiments, the processing engine 140 may transmit the final image to an external device, for example, for printing the final image.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added. For example, the operation 508 may be divided into multiple operations which include determining an output value of the objective function based on the image estimate, determining whether the output value of the objective function satisfy the termination criterion, etc.

Figure 6:
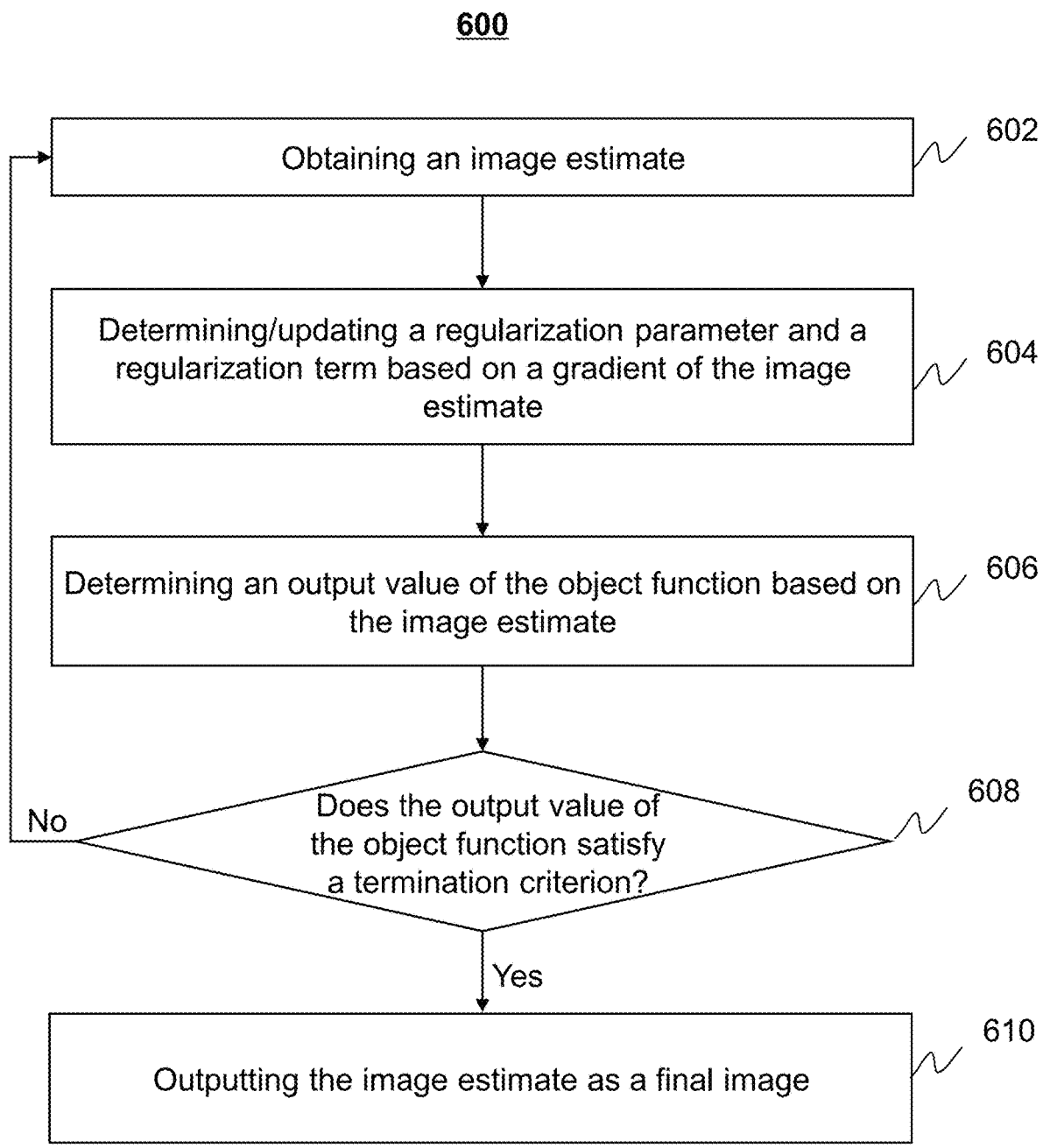
FIG. 6 is a flowchart illustrating an exemplary process for determining a final image based on one or more iterations according to some embodiments of the present disclosure.

FIG. 6 is a flowchart illustrating an exemplary process for reconstructing an image according to some embodiments of the present disclosure. At least a portion of process 600 may be implemented on the computing device 200 as illustrated in FIG. 2 or the mobile device 300 as illustrated in FIG. 3. In some embodiments, one or more operations of the process 600 may be implemented in the imaging system 100 as illustrated in FIG. 1. In some embodiments, one or more operations in the process 600 may be stored in the storage device 160 and/or the storage (e.g., the ROM 230, the RAM 240, etc.) as a form of instructions, and invoked and/or executed by the processing engine 140, or the processor 220 of the processing engine 140. In some embodiments, the instructions may be transmitted in a form of electronic current or electrical signals. In the following description, for illustration purposes, the image to be reconstructed is a CT image and is not intended to limit the scope of the present disclosure.

In 602, the processing engine 140 (e.g., the image reconstruction model 420) may obtain an image estimate. In some embodiments, the image estimate may be determined according to operation 504 in FIG. 5. For example, the image estimate may be determined based on default settings of the imaging system 100 or an instruction from a user. As another example, the image estimate may be reconstructed based on the scan data related to a subject.

In 604, the processing engine 140 (e.g., the image reconstruction model 420) may determine a regularization parameter and a regularization term based on a gradient of the image estimate. In some embodiments, the processing engine 140 may determine the regularization term based on two different regularization functions (e.g., linear and quadratic). In some embodiments, the processing engine 140 may determine the regularization parameter based on the first parameter related to the linear regularization and the second parameter related to the quadratic regularization. For instance, the regularization parameter may be determined according to equation (2) and/or equation (3).

In 606, the processing engine 140 (e.g., the image reconstruction model 420) may determine an output value of the objective function based on the image estimate. For instance, the output value of the objective function may be determined based on the estimated measurement of the image estimate, the actual measurement of the scan data, the regularization term, and the regularization parameter. Merely by way of example, the output value of the objective function may be determined according to equation (1).

In 608, the processing engine 140 (e.g., the image reconstruction model 420) may determine whether the output value of the objective function satisfy a termination criterion. In some embodiments, the terminal criterion may include that the output value of the objective function is minimal or smaller than a preset value, the change of the output value of the objective function in two or more consecutive iterations may be equal to or smaller than a threshold, the difference between the output value of the objective function and the preset value is equal to or smaller than a threshold, or the like, or any combination thereof.

In response to a determination that the objective function does not satisfy the termination criterion, the process 600 may return to operation 602 to update the image estimate through one or more iterations. In some embodiments, the processing engine 140 may perform the one or more iteration processes according to an iterative reconstruction algorithm, including but not limited to an algebraic reconstruction technique (ART), a simultaneous iterative reconstruction technique (SIRT), a multaneous algebraic reconstruction technique (SART), an adaptive statistical iterative reconstruction (ASIR) technique, a model based iterative reconstruction (MBIR) technique, a sinogram affirmed iterative reconstruction (SAFIR) technique, or the like, or a combination thereof. In some embodiments, the final image obtained after the one or more iteration processes may satisfy the following equation (4):

$$I^* = \arg \min_{I} \ (\|FP(I) - P\|_w^2 + \beta R(I)), \qquad (4)$$

wherein I* denotes the final image obtained by optimizing the right side of the equation (4). In some embodiments, such optimization may be achieved by various methods, including but not limited to a Newton's method, a gradient descent method, a conjugate gradient method, or the like, or any combination thereof.

In some embodiments, the processing engine 140 may modify the estimated projection data to decrease the difference between the estimated projection data and the actual projection data. The processing engine 140 may further perform a back projection (e.g., according to an FBP algorithm) on the modified estimated projection data to obtain the updated image estimate. In some embodiments, the processing engine 140 may perform a back projection on the difference between the estimated projection data and the actual projection data to generate a difference image. The processing engine 140 may further modify the characteristics (e.g., the gray values) of the pixels or voxels in the image estimate to obtain the updated image estimate. In 604, the processing engine 140 may update the regularization parameter and the regularization term based on the gradient of the updated image estimate. In 606, the processing engine 140 may determine an output value of the objective function based on the updated image estimate. In 608, the processing engine 140 may determine whether the output value of the objective function satisfy the termination criterion. In response to a determination that the output value of the objective function does not satisfy the termination criterion, the process 600 may return to 602 for one or more additional iterations. In response to a determination that the output value of the objective function satisfies the termination criterion, the process 600 may proceed to operation 610.

In 610, the processing engine 140 (e.g., the image reconstruction model 420) may output the image estimate as a final image. In some embodiments, the processing engine 140 may perform one or more additional operations based on the final image, such as reconstructing a 3D image based on a plurality of 2D final images. In some embodiments, the processing engine 140 may transmit the final image to the terminal(s) 130 for display. In some embodiments, the processing engine 140 may transmit the final image to the storage device 150 to store the final image.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added. For example, the process 600 may further include an operation to obtain the objective function from the storage device 160 and/or the storage (e.g., the ROM 230, the RAM 240, etc.).

Figure 7A:
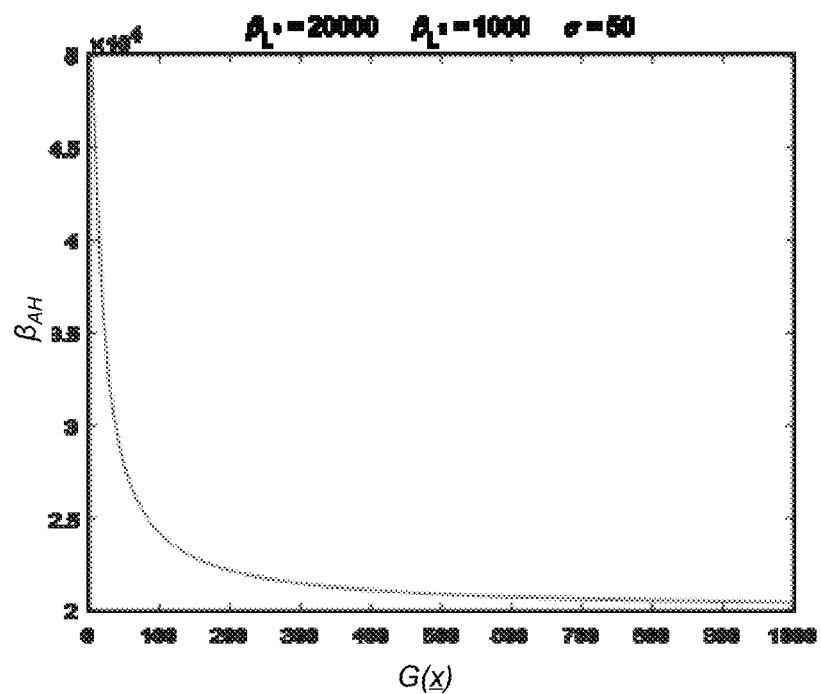
FIGS. 7A to 7B are analytical diagrams illustrating exemplary values of a regularization parameter according to some embodiments of the present disclosure.
Figure 7B:
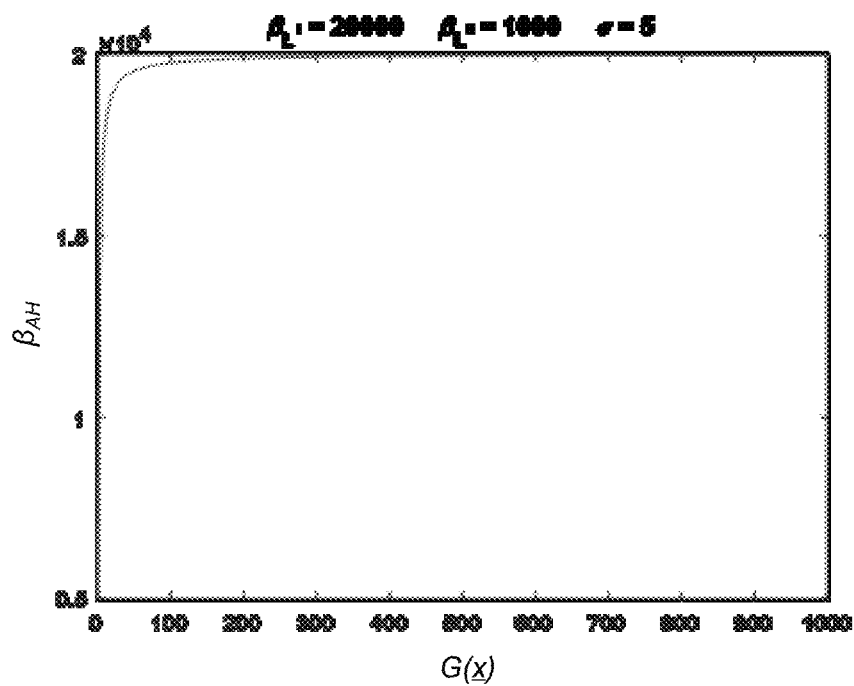

FIGS. 7A to 7B are analytical diagrams illustrating exemplary values of a regularization parameter according to some embodiments of the present disclosure. Merely for illustration purposes, the values of the regularization parameter shown in FIGS. 7A to 7B are determined according to the equation (3), where the value of a is 0.3, the value of the $\beta_1$ is 20000, and the value of the $\beta_2$ is 1000. In FIG. 7A, the value of $\sigma$ for the gradient of the image estimate or the updated image estimate (G($\underline{x}$)) is 50 hounsfield unit (HU). As shown in FIG. 7A, the regularization parameter $\beta_{AH}$ decreases when the gradient (G($\underline{x}$)) increases. When the gradient G($\underline{x}$) increases from 0-300, the regularization parameter $\beta_{AH}$ decreases dramatically from about 5×10$^4$ to about 2.1×10$^4$. In FIG. 7B, the value of the threshold a for the gradient G($\underline{x}$) is 5. As shown in FIG. 7B, the regularization parameter $\beta_{AH}$ increases when the gradient of the image estimate or the updated image estimate (G($\underline{x}$)) increases. When the gradient G($\underline{x}$) increases from 0-100, the regularization parameter $\beta_{AH}$ increases dramatically from 0 to about 2×10$^4$. These results indicate that the value of the threshold for the gradient of the image estimate or the updated image estimate may have a significant influence on the value of the regularization parameter, thus leading to a significant impact on the intensity of the regularization term.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the values of α, $\beta_1$, σ, and/or $\beta_2$ may be different from those values shown in FIGS. 7A to 7B. As another example, the transition function for determining the regularization parameter may be different from equation (3).

Figure 8A:
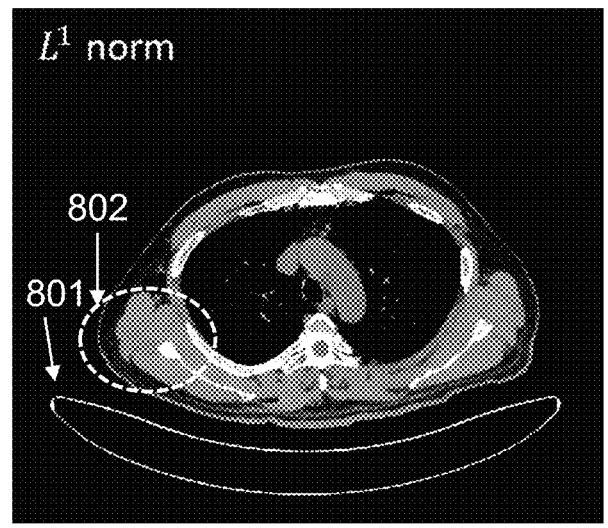
FIGS. 8A to 8D are exemplary final images of a transaxial view reconstructed based on a total variation regularization term, a quadratic regularization term, a Huber regularization term with a first parameter, and a Huber regularization term with an adaptive regularization parameter, respectively, according to some embodiments of the present disclosure.
Figure 8B:
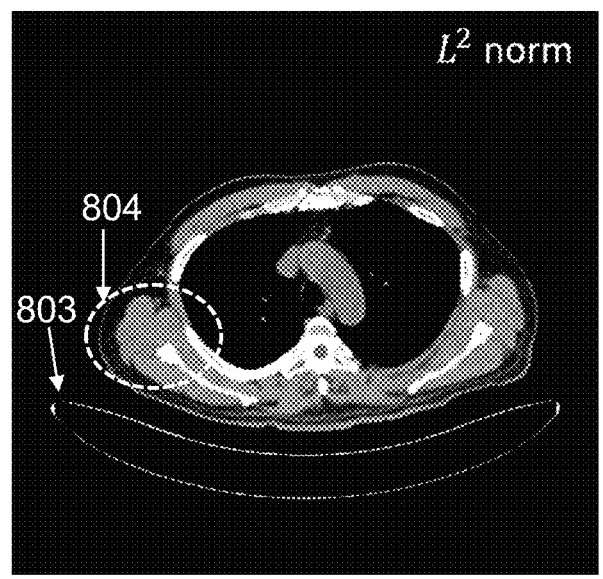
Figure 8C:
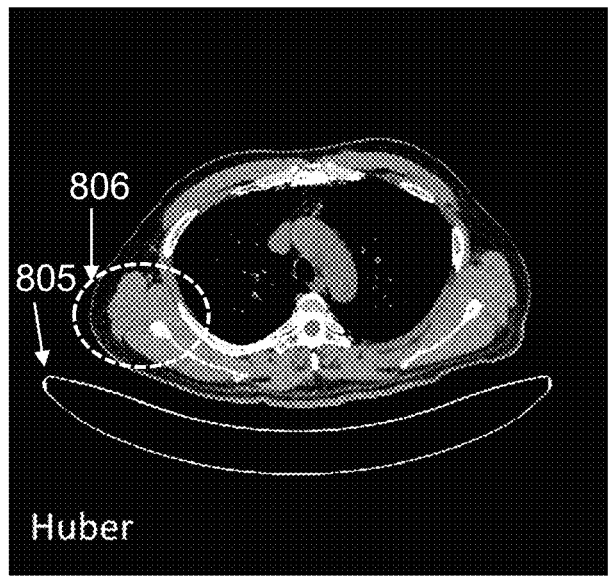
Figure 8D:
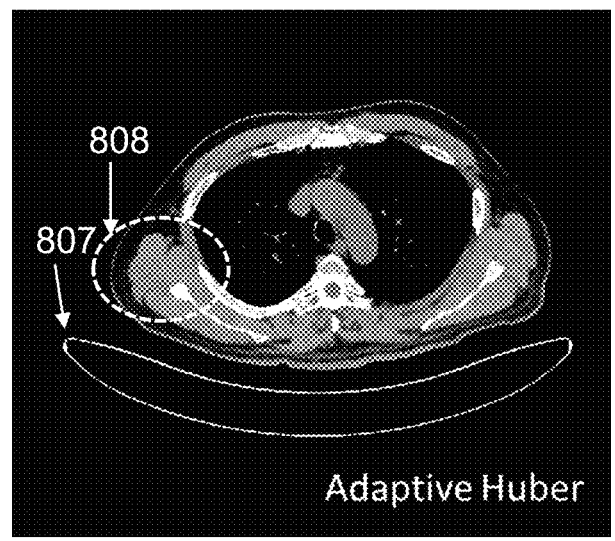
Figure 9A:
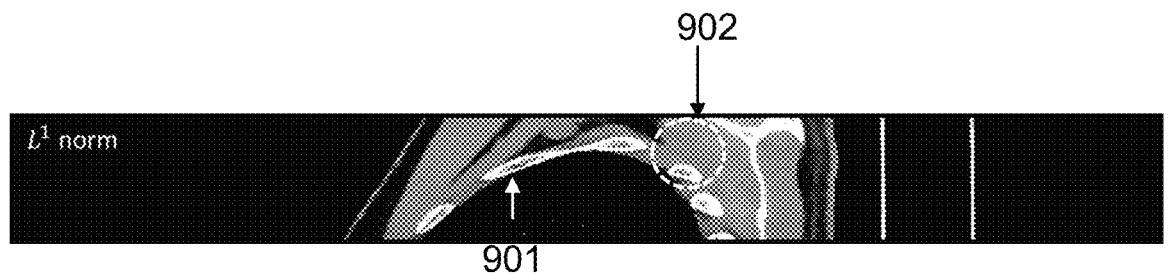
FIGS. 9A to 9D are exemplary final images of a sagittal view reconstructed based on a total variation regularization term, a quadratic regularization term, a Huber regularization term with a first parameter, and a Huber regularization term with an adaptive regularization parameter, respectively, according to some embodiments of the present disclosure.
Figure 9B:
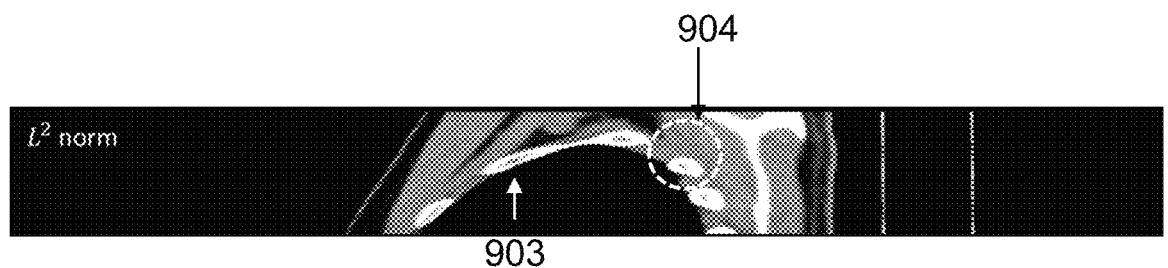
Figure 9C:
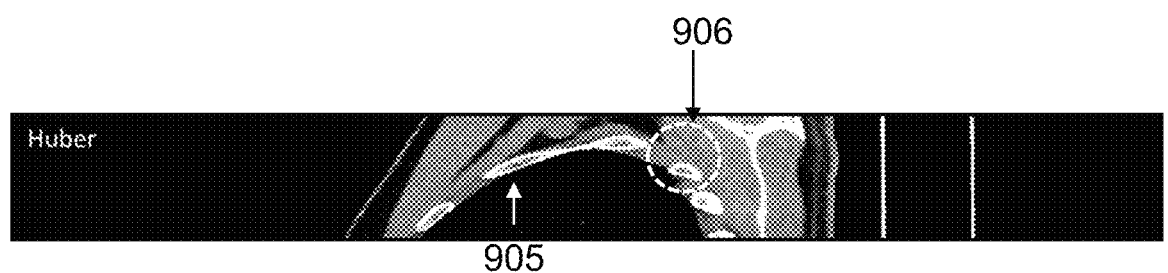
Figure 9D:
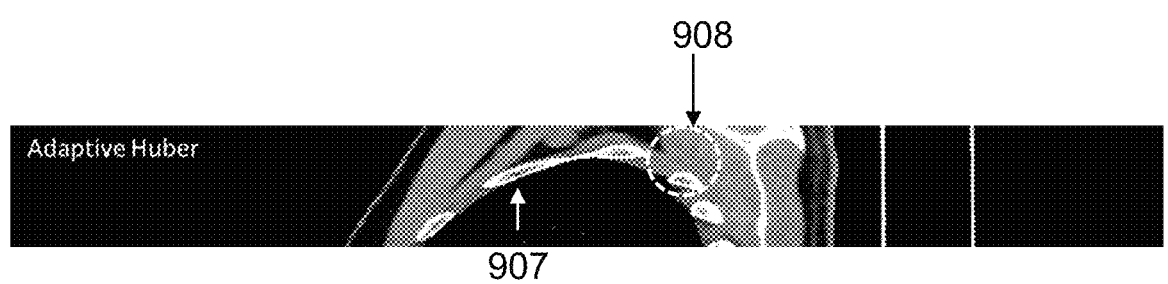

FIGS. 8A to 8D are exemplary final images of a transaxial view reconstructed based on a total variation regularization term, a quadratic regularization term, a Huber regularization term with a first parameter, and a Huber regularization term with an adaptive regularization parameter, respectively, according to some embodiments of the present disclosure. FIGS. 9A to 9D are exemplary final images of a sagittal view reconstructed based on a total variation regularization term, a quadratic regularization term, a Huber regularization term with a first parameter, and a Huber regularization term with an adaptive regularization parameter, respectively, according to some embodiments of the present disclosure. Merely by way of example, FIGS. 8A to 8D and FIGS. 9A to 9D are reconstructed based on the objective function represented by the equation (1). The regularization parameter β for FIG. 8A and FIG. 9A is the first parameter ($\beta_1$) related to the linear regularization function, the regularization parameter β for FIG. 8B and FIG. 9B is the second parameter ($\beta_2$) related to the quadratic regularization function, the regularization parameter β for FIG. 8C and FIG. 9C is $\beta_1$, and the regularization parameter β for FIG. 8D and FIG. 9D is an adaptive regularization parameter $\beta_{AH}$. The adaptive regularization parameter $\beta_{AH}$ is determined according to the equation (4) for illustration purposes. For FIGS. 8A-8D and FIGS. 9A-9D, the value of a is 0.3, the value of the $\beta_1$ is 20000, the value of the $\beta_2$ is 1000, and the value of the threshold a for the gradient of the image estimated or the updated image estimate is 50 HU. As shown in FIGS. 8A and 9A, the reconstructed image based on the linear regularization term may have achieved noise reduction with preserved edge information and the spatial resolution of the reconstructed image is high, but the image texture seems unnatural. As shown in FIGS. 8B and 9B, the reconstructed image based on the quadratic regularization term may have reduced noise with a natural image texture but degraded edge information and decreased spatial resolution. For example, as compared to an edge region 801 in FIG. 8A, information of the edge region 803 is not preserved appropriately in FIG. 8B. The image texture shown in a tissue region 802 in FIG. 8A and a tissue region 902 in FIG. 9A seems less natural than a region 803 in FIG. 8B and a region 904 in FIG. 9B, respectively. Moreover, the edge region 901 in FIG. 9A have preserved more accurate and more clear edge information than the edge region 903 in FIG. 9B. As shown in FIG. 8C, FIG. 8D, FIG. 9C and FIG. 9D, the reconstructed image obtained based on the Huber regularization term as the regularization parameter achieved a relatively high spatial resolution, preserved appropriate edge information, and obtained a natural image texture. For example, information of the edge regions 805, 807, 905 and 907 is appropriately preserved. Tissue regions 806, 808, 906, and 908 have a natural image texture. However, more noise may be found in the tissue regions 806 and 906 than the tissue regions 808 and 908. This may be due to the fact that in FIGS. 8D and 9D, the adaptive regularization parameter $\beta_{AH}$ is used in the objective function for image reconstruction. The adaptive regularization parameter $\beta_{AH}$ may change smoothly based on the first parameter) $\beta_1$ and the second parameter $\beta_2$ as the gradient G($\underline{x}$) changes from 0 to +∞. As a result, the adaptive regularization parameter $\beta_{AH}$ may define a more suitable strength of regularization than the first parameter $\beta_1$ (and/or the second parameter $\beta_2$). Thus, FIG. 8D and FIG. 9D may achieve a natural image texture with a relatively strong noise reduction and a relatively high spatial resolution.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting.

Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system configured to reconstruct an image in an imaging system, comprising:
at least one non-transitory storage medium including a set of instructions; and
at least one processor in communication with the at least one non-transitory storage medium, wherein when executing the set of instructions, the at least one processor is configured to cause the system to:
obtain scan data representing an intensity distribution of energy detected at a plurality of detector elements;
determine an image estimate;
determine an objective function based on the scan data and the image estimate, wherein the objective function includes a regularization parameter which transitions between a first parameter determined based on linear regularization and a second parameter determined based on quadratic regularization;
iteratively update the image estimate until the objective function satisfies a termination criterion, and for each update,
update the regularization parameter based on a gradient of an updated image estimate; and
output a final image based on the updated image estimate when the objective function satisfies the termination criterion.

2. The system of claim 1, wherein the imaging system is one of a medical imaging system or a non-invasive industrial imaging system.

3. The system of claim 2, wherein the medical imaging system is at least one of a computed tomography system, a positron emission tomography system, or a single photon emission computed tomography system.

4. The system of claim 1, wherein to determine the objective function, the at least one processor is further configured to cause the system to:
  determine an estimated measurement based on the image estimate or the updated image estimate;
  determine an actual measurement based on the scan data; and
  determine the objective function based at least in part on a difference between the estimated measurement and the actual measurement.

5. The system of claim 1, wherein the objective function further includes a regularization term, and the at least one processor is further configured to cause the system to:
  multiply the regularization term by the regularization parameter.

6. The system of claim 5, wherein the regularization term relates to a Huber type transition between the linear regularization and the quadratic regularization.

7. The system of claim 1, wherein the first parameter is determined based on an L-curve method, a quasi-optimal rule, or a minimal-error rule.

8. The system of claim 5, wherein the regularization term is a Huber regularization term.

9. The system of claim 6, wherein to update the regularization parameter, the at least one processor is further configured to cause the system to:
  determine and update a regularization strength based on a scalar parameter.

10. The system of claim 9, wherein to update the regularization parameter, the at least one process is further configured to cause the system to:
  update the regularization parameter based on an exponential function related to the first parameter, the second parameter, the scalar parameter, and the gradient of the image estimate.

11. A method for reconstructing an image in an imaging system, implemented on a machine having at least one processor and a storage device, the method comprising:
  obtaining scan data representing an intensity distribution of energy detected at a plurality of detector elements;
  determining an image estimate;
  determining an objective function based on the scan data and the image estimate, wherein the objective function includes a regularization parameter which transitions between a first parameter determined based on linear regularization and a second parameter determined based on quadratic regularization;
  iteratively updating the image estimate until the objective function satisfies a termination criterion, and for each update,
    updating the regularization parameter based on a gradient of an updated image estimate; and
  outputting a final image based on the updated image estimate when the objective function satisfies the termination criterion.

12. The method of claim 11, wherein the imaging system is one of a medical imaging system or a non-invasive industrial imaging system.

13. The method of claim 11, wherein the determining an objective function based on the scan data and the image estimate includes:
  determining an estimated measurement based on the image estimate or the updated image estimate;
  determining an actual measurement based on the scan data; and
  determining the objective function based at least in part on a difference between the estimated measurement and the actual measurement.

14. The method of claim 11, wherein the objective function further includes a regularization term, and the method further comprises:
  multiplying the regularization term by the regularization parameter.

15. The method of claim 14, wherein the regularization term relates to a Huber type transition between the linear regularization and the quadratic regularization.

16. The method of claim 15, wherein the first parameter is determined based on an L-curve method, a quasi-optimal rule, or a minimal-error rule.

17. The method of claim 14, wherein the regularization term is a Huber regularization term.

18. The method of claim 15, wherein the updating the regularization parameter based on a gradient of an updated image estimate includes:
  determining and updating a regularization strength based on a scalar parameter.

19. The method of claim 18, wherein the updating the regularization parameter based on a gradient of an updated image estimate includes:
  updating the regularization parameter based on an exponential function related to the first parameter, the second parameter, the scalar parameter, and the gradient of the image estimate.

20. A non-transitory computer readable medium, comprising at least one set of instructions, wherein when executed by at least one processor of a computer device, the at least one set of instructions direct the at least one processor to:
  obtain scan data representing an intensity distribution of energy detected at a plurality of detector elements;
  determine an image estimate;
  determine an objective function based on the scan data and the image estimate, wherein the objective function includes a regularization parameter which transitions between a first parameter determined based on linear regularization and a second parameter determined based on quadratic regularization;
  iteratively update the image estimate until the objective function satisfies a termination criterion, and for each update,
    update the regularization parameter based on a gradient of an updated image estimate; and
  output a final image based on the updated image estimate when the objective function satisfies the termination criterion.

* * * * *